US010631055B2

(12) United States Patent
Bender et al.

(10) Patent No.: US 10,631,055 B2
(45) Date of Patent: Apr. 21, 2020

(54) RECORDING RATINGS OF MEDIA SEGMENTS AND PROVIDING INDIVIDUALIZED RATINGS

(71) Applicant: International Business Machines Corporation, Armonk, NY (US)

(72) Inventors: Michael Bender, Rye Brook, NY (US); Greg J. Boss, Saginaw, MI (US); Edward T. Childress, Austin, TX (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/285,994

(22) Filed: Oct. 5, 2016

(65) Prior Publication Data

US 2018/0098125 A1     Apr. 5, 2018

(51) Int. Cl.
*H04N 21/466*     (2011.01)
*H04N 21/475*     (2011.01)
(Continued)

(52) U.S. Cl.
CPC ... *H04N 21/4756* (2013.01); *H04N 21/23418* (2013.01); *H04N 21/251* (2013.01);
(Continued)

(58) Field of Classification Search
CPC ............. H04N 21/4756; H04N 21/251; H04N 21/25891; H04N 21/23418; H04N 21/44008; H04N 21/466; H04N 21/8456
(Continued)

(56) References Cited

U.S. PATENT DOCUMENTS 6,438,579 B1 * 8/2002 Hosken ............. G06F 17/30867
707/999.002
8,726,304 B2 * 5/2014 Petrovic ............... H04N 21/252
725/13
(Continued)

FOREIGN PATENT DOCUMENTS

EP     2 763 421 A1     8/2014

OTHER PUBLICATIONS

Pereira Jr. et al., "Multi-criteria Fusion of Heterogeneous Information for Improving Situation Awareness on Emergency Management Systems", Springer International Publishing, Switzerland 2015, vol. 9173 of the series Lecture Notes in Computer Science, pp. 3-14, Jul. 21, 2015.
(Continued)

*Primary Examiner* — Nathan J Flynn
*Assistant Examiner* — Caroline Somera
(74) *Attorney, Agent, or Firm* — Scully, Scott, Murphy & Presser, P.C.; Brian Restauro, Esq.

(57) ABSTRACT

A method, system, and computer program product are disclosed for customized ratings for specified media items. In embodiments, the method comprises a user giving input about multiple segments of a first specified media item, analyzing the input from the user, and correlating the analyzed input with multiple segments of a second specified media item to provide to the user a customized content rating of the second media item. In embodiments, the system comprises a first processing device for receiving input from a user about multiple segments of a first specified media item; and a computing system for receiving the user input from the first processing device, for analyzing the user input, and for correlating the analyzed input with multiple segments of a second specified media item to provide to the user a customized content rating of the second media item.

16 Claims, 6 Drawing Sheets

(51) Int. Cl.
*H04N 21/258* (2011.01)
*H04N 21/25* (2011.01)
*H04N 21/44* (2011.01)
*H04N 21/234* (2011.01)
*H04N 21/845* (2011.01)

(52) U.S. Cl.
CPC . *H04N 21/25891* (2013.01); *H04N 21/44008* (2013.01); *H04N 21/466* (2013.01); *H04N 21/8456* (2013.01)

(58) Field of Classification Search
USPC .......................................................... 725/13
See application file for complete search history.

(56) References Cited

U.S. PATENT DOCUMENTS

| | | | | |
|---|---|---|---|---|
| 9,578,379 | B1* | 2/2017 | Klappert | H04N 21/4756 |
| 2008/0120345 | A1* | 5/2008 | Duncombe | G06F 3/0482 |
| 2008/0120636 | A1* | 5/2008 | Gahman | G06Q 30/02 725/28 |
| 2008/0306807 | A1* | 12/2008 | Amento | G06Q 30/02 705/7.33 |
| 2010/0050202 | A1* | 2/2010 | Kandekar | G06F 17/30244 725/14 |
| 2010/0071005 | A1* | 3/2010 | Kusunoki | G06Q 30/02 725/46 |
| 2010/0198773 | A1* | 8/2010 | Wallisch | G06Q 30/02 706/54 |
| 2012/0123992 | A1* | 5/2012 | Randall | G06F 17/30038 706/50 |
| 2013/0247109 | A1* | 9/2013 | Wachtfogel | G11B 27/002 725/52 |
| 2013/0305283 | A1* | 11/2013 | Yoon | H04N 21/4722 725/37 |
| 2013/0339433 | A1* | 12/2013 | Li | G06K 9/00 709/204 |
| 2014/0068433 | A1* | 3/2014 | Chitturi | H04N 21/41407 715/716 |
| 2015/0002086 | A1 | 1/2015 | Matos et al. | |
| 2015/0006751 | A1* | 1/2015 | Newell | H04L 65/601 709/231 |
| 2015/0095937 | A1* | 4/2015 | Tobin | H04N 21/2743 725/32 |
| 2015/0289014 | A1* | 10/2015 | Nandi | H04N 21/23418 725/28 |
| 2015/0310307 | A1* | 10/2015 | Gopalan | G06K 9/6215 382/103 |
| 2015/0326688 | A1* | 11/2015 | Aarnio | G06F 17/30029 707/748 |
| 2016/0142774 | A1 | 5/2016 | Sayyadi-Harikandehei | |
| 2016/0249116 | A1* | 8/2016 | Harb | H04N 21/8549 |
| 2016/0316268 | A1* | 10/2016 | Carmichael | H04N 21/4662 |

OTHER PUBLICATIONS

Lu et al., "Selective Transfer Learning for Cross Domain Recommendation", Hong Kong University of Science & Technology, arXis:1210.7056v1 [cs.LG]Oct. 26, 2012; Conference Paper—May 2013.

* cited by examiner

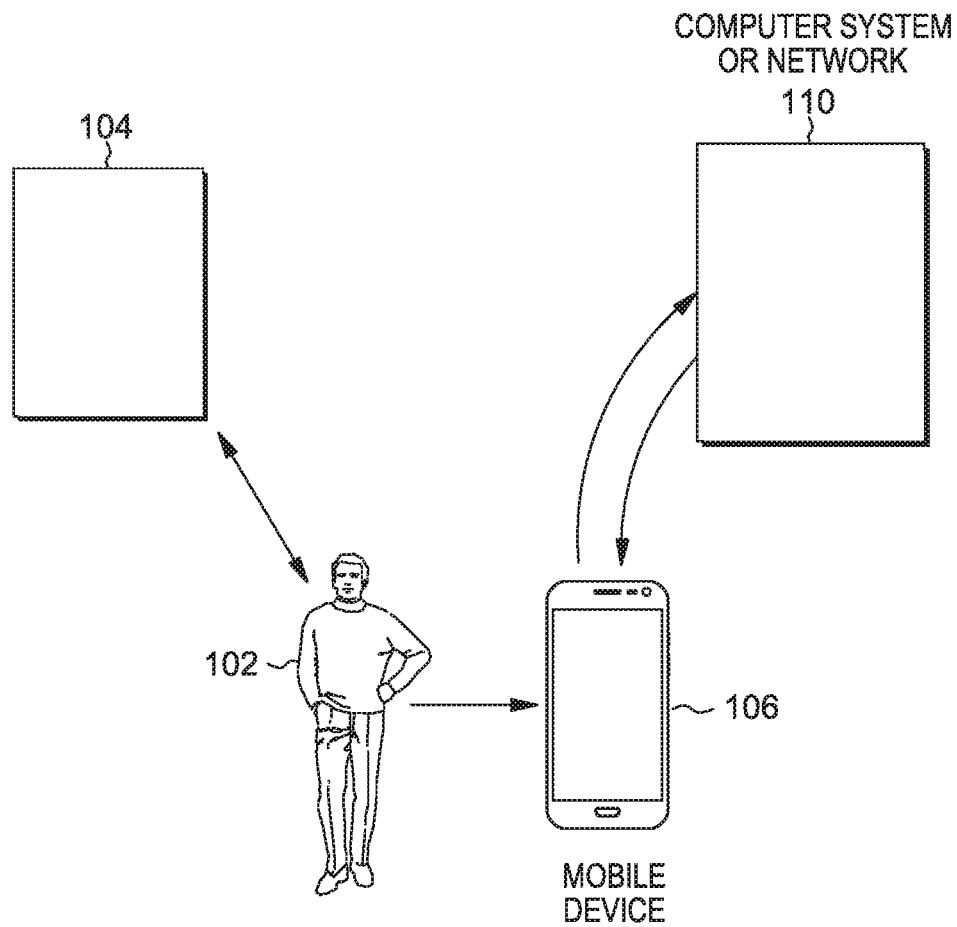

FIG. 1

PROVIDING CUSTOMIZED MOVIE RATINGS

122 — 1. A METHOD TO COLLECT RATINGS FOR MICRO SEGMENTS OF A MOVIE

124 — 2. A METHOD, TO ANALYZE MICRO RATINGS, CORRELATE THOSE WITH SIMILAR MICRO SEGMENTS OF PREVIOUSLY UNWATCHED MOVIES AND PROVIDE A CUSTOMIZED CONTENT RATING TO THE USER

126 — 3. A METHOD TO COLLECT ADJUSTED RATING INPUTS FROM A USER OF AN EXISTING CONTENT GUIDE AND PROVIDE A CUSTOMIZED CONTENT RATING TO THE USER

FIG. 2

METHOD TO COLLECT RATINGS FOR MICRO SEGMENTS OF A MOVIE

132 — 1. USER BEGINS WATCHING A MOVIE ON A FIRST SCREEN

134 — 2. USER MAKES A JUDGEMENT CALL (E.G., RATING) ON THE ELEMENT THEY JUST EXPERIENCED (WATCHED, READ, HEARD)

1. THE RATING COULD BE IN THE FORM OF LIKES AND DISLIKES, E.G., ONE TO FIVE STARS
    2. THE RATING COULD BE IN THE FORM OF A CONTENT ADVISORY, E.G., PG 13, R, ETC.

136 — 3. THE SYSTEM DEFINES THE MICRO SEGMENTS BASED ON EITHER

1. PREDEFINED SEGMENTS EITHER AUTOMATICALLY CREATED BY A RULESET OR BY A HUMAN
    2. DYNAMICALLY EACH TIME THE USER ENTERS A NEW RATING

FIG. 3

EXAMPLE OF A PARENT'S ANALYSIS

- 162 — THE CAMPERS SAT AROUND THE FIRE AND MADE SMORES (RAISE RATING FOR SOMEONE THAT IS AFRAID OF FIRE)

- 162 — THE DOG BARKED AT THE CHILD (RAISE RATING FOR SOMEONE THAT IS AFRAID OF DOGS)

- 164 — THE MONKEYS HOWLED IN THE ZOO WHILE THE LIONS ROARED (LOWER RATING, AS CHILD IS NOT AFRAID OF ANIMALS)

- 164 — THE SKIER FELL DOWN THE MOUNTAIN (LOWER RATING, NO FEAR OF INJURY)

FIG. 6

RECORDING RATINGS OF MEDIA SEGMENTS AND PROVIDING INDIVIDUALIZED RATINGS

BACKGROUND

This invention, generally, relates to rating media items, and more specifically, to providing individualized media ratings.

People have long tried to predict if a person will like a movie, book or other form of entertainment based on the reactions of others in a person's social network and based on previous feedback from a user. This is implemented in many online systems. The same principles exist in online shopping and social network matching sites.

Applying a common movie rating standard to millions of people is problematic since everyone does not share the same values and interpretations of what would make a movie desirable or undesirable. The current system in the United States of applying a MPAA standard of G, PG, PG13, R and NC 17 is drastically inflexible and oftentimes inconsistent.

SUMMARY

Embodiments of the invention provide a method, system and computer program product for customized ratings for specified media items. In embodiments, the method comprises a user giving input about multiple segments of a first specified media item, analyzing said input from the user, and correlating the analyzed input with multiple segments of a second specified media item to provide to the user a customized content rating of the second media item. In embodiments, the system comprises a first processing device for receiving input from a user about multiple segments of a first specified media item; and a computing system for receiving the user input from the first processing device, for analyzing the user input, and for correlating the analyzed input with multiple segments of a second specified media item to provide to the user a customized content rating of the second media item.

Embodiments of the invention utilize a program (such as a mobile app) that, for example, gives the user a few easily selected buttons (e.g., one star, two stars, three stars, etc.) and lets the users rate individual parts of a movie as the user is watching the movie. The method then utilizes cognitive services to analyze the patterns that appear for an individual user that indicate reasons why the individual gave the one/two/three star ratings they did. The method then performs a similar micro analysis on the components of an unwatched movie and presents a personalized rating of that unwatched movie. This allows for a customized movie rating which could take the form of a like/dislike rating or an MPAA type rating (e.g., PG13 vs. R). Items that would be evaluated by the cognitive analysis service may include, for example, language for personal preferences, comprehension level, comedy types, use of language as well as visual content.

Embodiments of the invention analyze a movie or take an objective analysis that was done by a human, as is done on IMDB through the Parents Guide, and then have a cognitive service learn as the parent or user highlights the items which would cause them to change the official rating (either up or down). This serves to further enhance the cognitive analysis previously discussed and produce more accurate predictions of what a user would rate a particular movie.

Embodiments of the invention collect ratings on micro segments of a movie, analyze the images and language for offensive or enjoyed content, and compare individual likes and dislikes to other movies that are reviewed by a cognitive system. Embodiments of the invention also allow for expanded tuning of the recommendations by allowing for the review of web based content and tagging content that an individual would upgrade or downgrade a rating compared to the larger population, and using that when determining a rating for unwatched movies.

BRIEF DESCRIPTION OF THE SEVERAL VIEWS OF THE DRAWINGS

FIG. 1 depicts a method and system in accordance with an embodiment of the invention.

FIG. 2 illustrates a method that provides customized movie ratings in accordance with an embodiment of the invention.

FIG. 3 shows a procedure to collect ratings for segments of a movie from a person who is watching the movie.

FIG. 6 shows items in a movie segment that would cause a viewer to raise or lower a rating for the movie segment.

DETAILED DESCRIPTION

Figure 4:
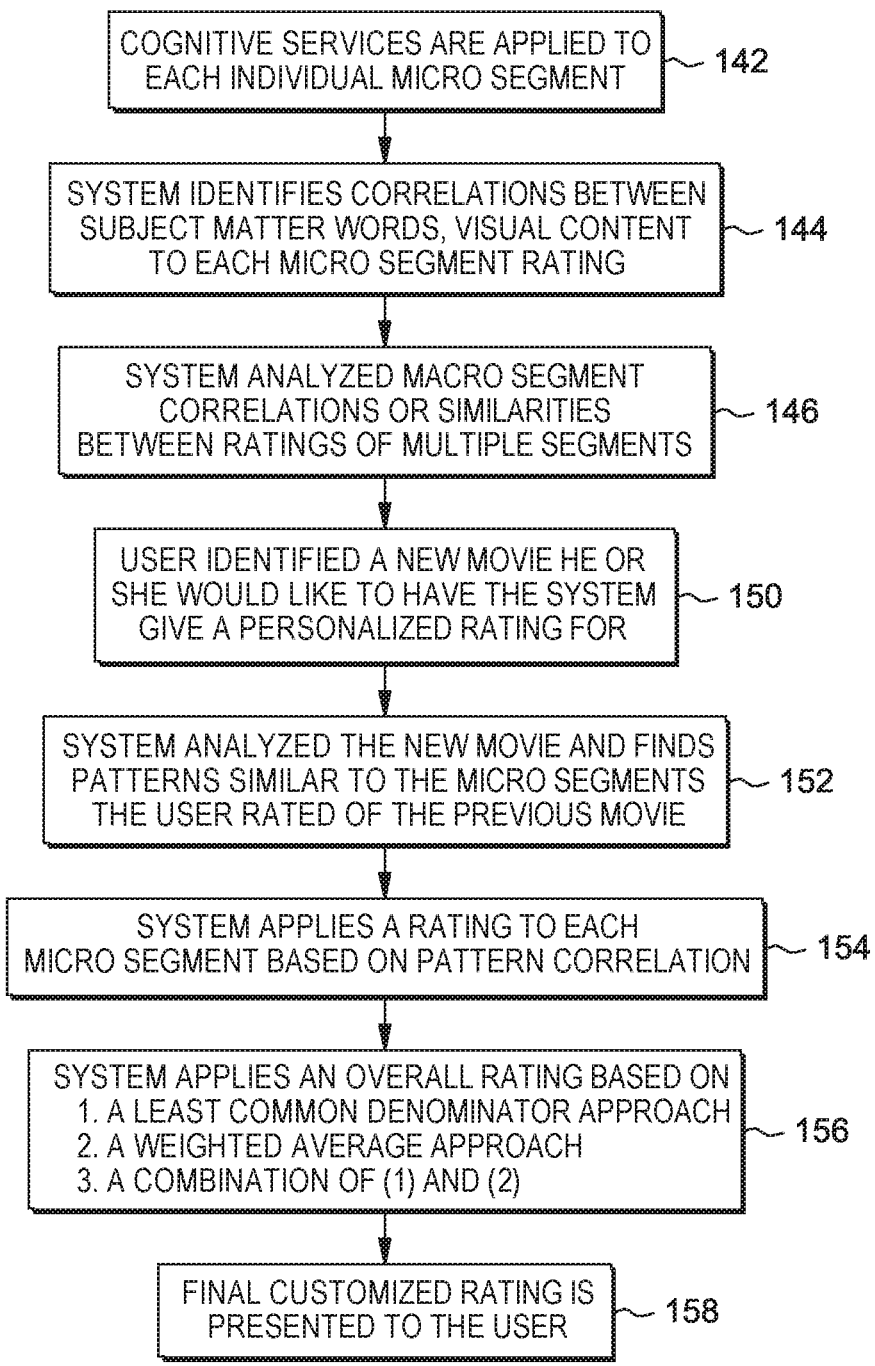
FIG. 4 shows a method to provide customized content rating to a user based on movie segment ratings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method, system and computer program product for providing customized ratings for specified media items. As mentioned above, people have long tried to predict if a person will like a movie, book or other form of entertainment based on the reactions of others in a person's social network and based on previous feedback from a user. This is implemented in many online systems. The same principles exist in online shopping and social network matching sites.

Applying a common movie rating standard to millions of people is problematic since everyone does not share the same values and interpretations of what would make a movie desirable or undesirable. The current system in the United States of applying a MPAA standard of G, PG, PG13, R and NC 17 is drastically inflexible and oftentimes inconsistent. Users would benefit from a system that could take inputs, analyze a movie (or any media) and automatically apply a personalized rating that matches perfectly with an individual's preferences, tastes and values.

FIG. 1 illustrates a method and system in accordance with an embodiment of the invention. In this embodiment, generally, a user 102 watches a movie on a display or screen 104 and provides input about segments of the movie. For instance, this input may be provided via a mobile communications device 106. This input is received by a computer system or network 110 and analyzed, and the analyzed input is used to rate another movie for the user 102. This individualized rating may then be given to the user 102.

Figure 5:
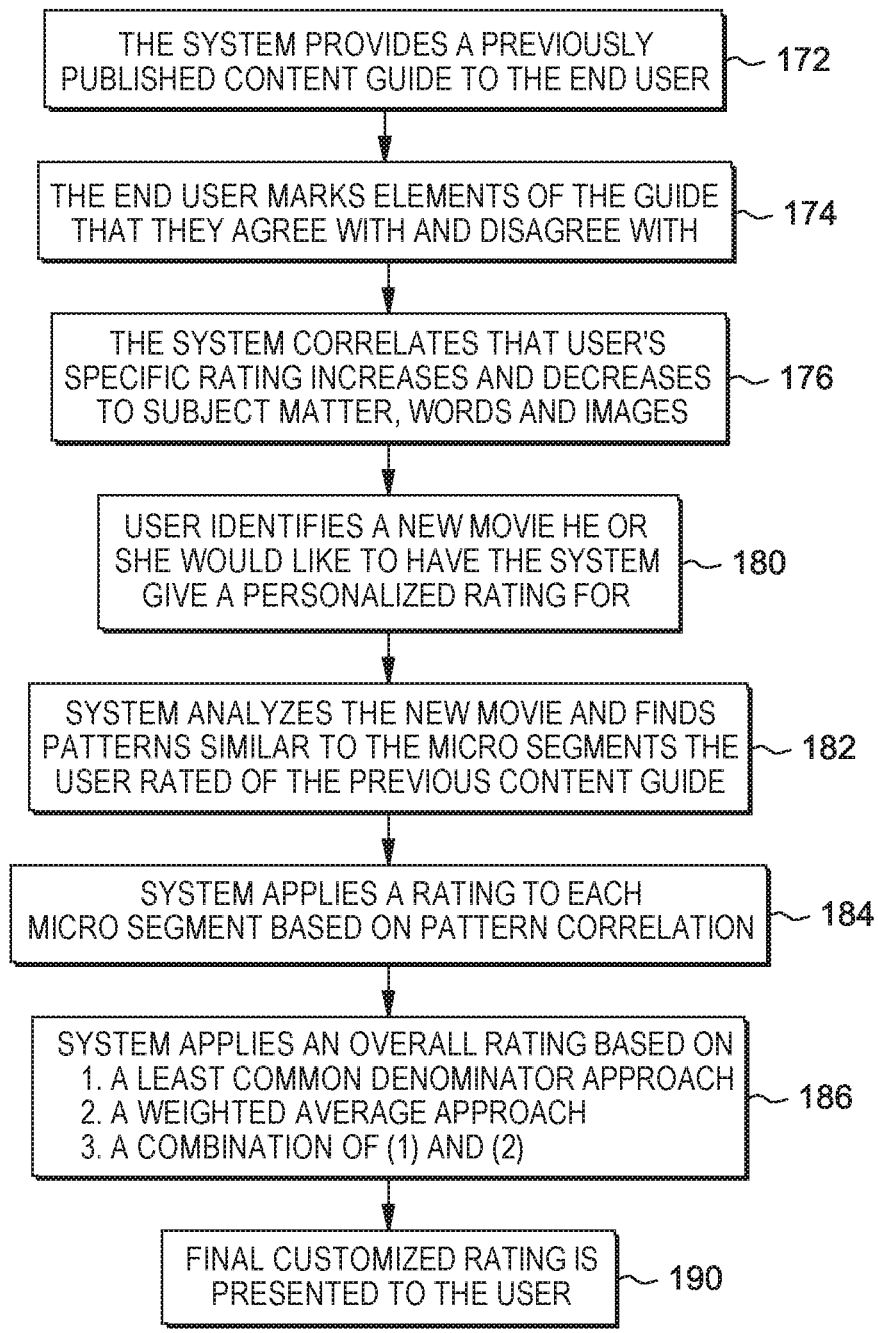
FIG. 5 illustrates a method to provide an overall customized rating to a user for a movie he user has not seen.

With reference to FIG. 2, embodiments of the invention provide customized movie ratings for individuals comprising: a method 122 to collect ratings for micro segments of a movie; a method 124 to analyze micro ratings, correlate those with similar micro segments of previously unwatched movies and provide a customized content rating to the user; and a method 126 to collect adjusted rating inputs from a user of an existing content guide and provide a customized content rating to the user. FIGS. 3-5 illustrate embodiments of these methods in more detail.

FIG. 3 shows an embodiment of a method to collect ratings for micro segments of a movie. In this method, a system will enter a learning mode and present the user with a first screen to watch a movie and a second user interface screen to provide a real time rating of the current micro segment. For example, this second screen may be a mobile device but could be a split screen on a computer, a second monitor, or any other similar setup. In one embodiment, the system is setup to predefine the micro segments. In this case, the micro segments can be predefined by a human or programmatically by analyzing scene changes and timings. In another embodiment, a micro segment can be dynamically defined by the user that is providing the ratings. In this case, the segments may be defined each time a new rating is provided with a segment break occurring before the actual rating was input.

With the example illustrated in FIG. 2, at 132, the user begins watching a movie on a first screen. At 134, the user makes a judgment call (e.g. rating) on the element they just experienced (watched, read, heard). The rating could be in the form of likes and dislikes, e.g. from one to five stars, or the rating could be in the form of a content advisory, e.g. P13, R, etc. At 136, the system defines the micro segments based on either predefined segments either automatically created by a ruleset or by a human, or dynamically each time the user enters a new rating.

FIG. 4 shows a method to analyze micro ratings, correlate those rating with similar micro segments of previously unwatched movies, and provide a customized content rating to the user. In this method, cognitive services are employed including sentiment analysis, alchemy language, tone analyzer, visual recognition, and personality insight. The method takes each micro segment and then applies the cognitive analysis to determine what occurred during that segment that caused the use to provide the corresponding rating. In some cases, the segment will have specific objectionable subject matter content that can be correlated to the rating, and in other cases, the segment will have specific objectionable words that can be correlated to the rating. The system will come up with as many "micro correlations" (inter segment) as it can, and then it will look at all of the segments for macro correlations (intra segment) to verify patterns that cause a specific individual to rate a segment of the movie a certain way.

The final step of the process involves the system to provide an overall rating for the movie that is different than the inflexible, "one size fits all" MPAA or movie review ratings. The system will typically take a least common denominator approach—for example, if one segment of the movie was rated as containing rated R type material and everything else was rated PG13 or lower, then a final rating of R would be given. In another alternative approach, the system could weight the segments equally and if a predominance of segments were rated one way with few outliers, then the overall rating could be the weighted average.

More specifically, at step 142, cognitive analysis services are applied to each individual micro segment. At 144, the system identifies correlations between subject matter, words, visual content to each micro segment rating; and at 146, the system analyzes macro segment correlations or similarities between ratings of multiple segments. At 150, the user identifies a new movie he or she would like to have the system give a personalize rating for. At 152, the system analyzes the new movie and finds patterns similar to the micro segments the user rated of the previous movie; and at 154, the system applies a rating to each micro segment based on pattern correlation. At 156, the system applies an overall rating based on, for example, a least common denominator approach, a weighted average approach, or a combination of these two approaches; and at 158, a final customized rating is presented to the user.

FIG. 5 illustrates a method to collect adjusted rating inputs from a user of an existing content guide and provide a customized content rating to the user. Generally, in this method, the user is presented with a content guide that was already published (such as can be found in IMDB). The system then prompts the user to mark the portions of the published content guide that they agree with and disagree with. In the example shown in FIG. 6, the user highlights the items 162 that would cause them to lower the rating for that micro segment and highlights the portions 164 that would cause them to raise the rating. This allows a user to provide rating input without having to watch a movie.

More specifically, as shown in FIG. 5 at 172, the system provides previously published content guide to the end user; and at 174, the end user marks elements of the guide that they agree with and disagree with. At 176, the system correlates that user's specific rating increases and decreases to subject matter, words and images. At 180, the user identifies a new movie that he or she would like to have the system give a personalized rating for; and at 182, the system analyzes the new movie and finds patterns similar to the micro segments the user rated of the previous content guide. At 184, the system applies a rating to each micro segment based on pattern correlation; and at 186, the system applies an overall rating based on a least common denominator approach, a weighted average approach, or a combination of the least common denominator approach and the weighted average approach. At 190, a final customized rating is presented to the user.

The methods of FIGS. 4 and 5 could be combined or used independently to achieve a customized content rating.

Any suitable cognitive system may be used in embodiments of the invention. For instance, one suitable cognitive system is the Watson cognitive system provided by the International Business Machines Corporation. Other suitable cognitive systems may also be used in embodiments of the invention.

Figure 7:
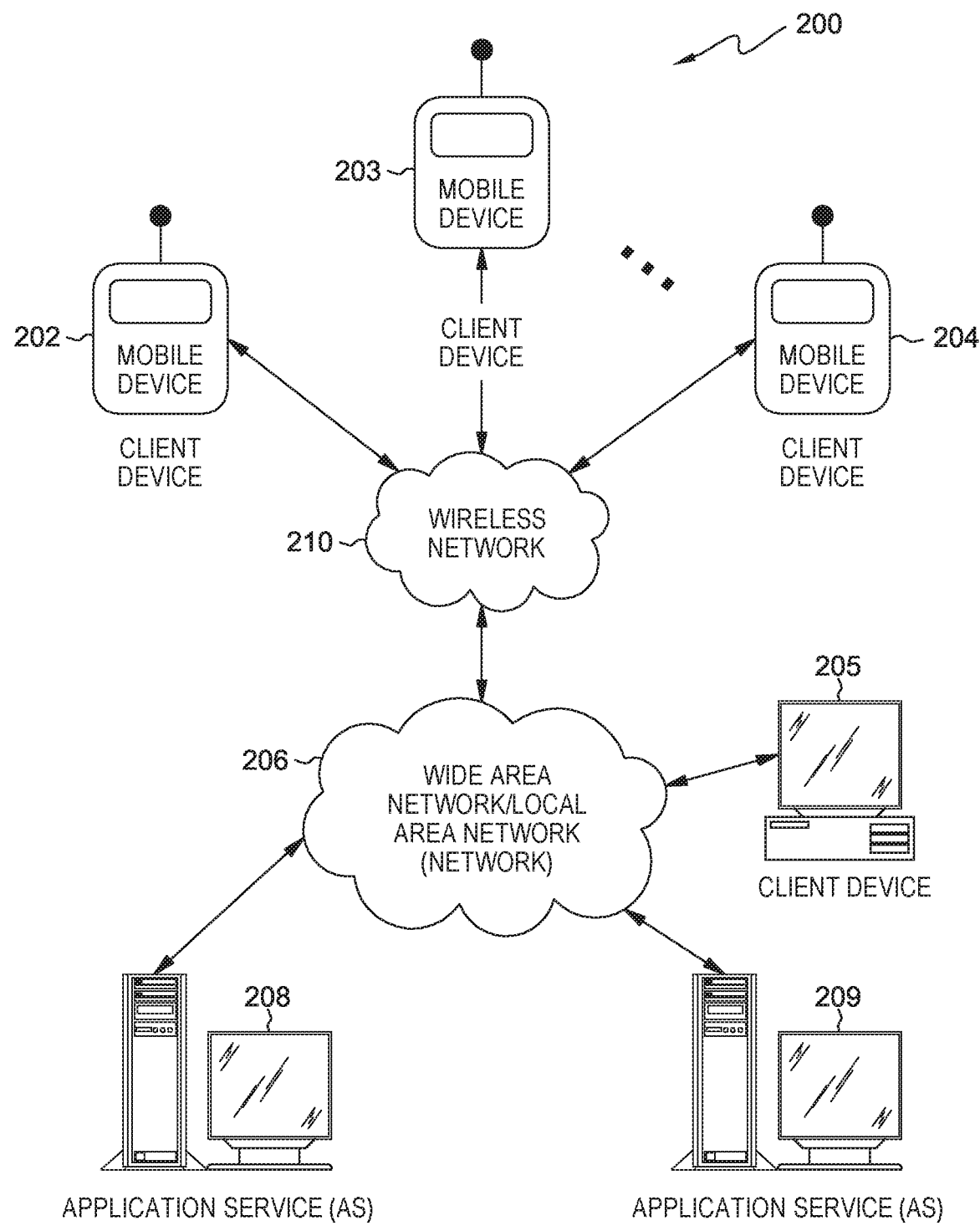
FIG. 7 shows a computer network environment that may be used to implement embodiments of the invention.

FIG. 7 shows components of an exemplary environment 200 in which the invention may be practiced. Not all the illustrated components may be required to practice the invention, and variations in the arrangement and type of the components may be made without departing from the spirit or scope of the invention. As shown, system 200 of FIG. 7 includes local area networks ("LANs")/wide area network 206, wireless network 210, mobile devices 202-204, client device 205, and application services (AS) 208-209.

Generally, mobile devices 202-204 may include virtually any portable computing device that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 is configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 308-309 are not limited to web servers.

Those of ordinary skill in the art will appreciate that the architecture and hardware depicted in FIG. 7 may vary.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of providing customized ratings for a user for specified media items based on user input and a cognitive analysis of the user, the method comprising:
    a computer system receiving the input from a user, via a user communications device, about each of multiple segments of a first specified media item;
    the computer system analyzing each of the multiple segments of the first specified media item, and applying a cognitive analysis of the user to determine what occurred during said each segment that caused the user to provide the input about said each segment and to determine one or more micro correlations between content of said each of the multiple segments and the input given by the user about the each of the multiple segments;
    the computer system analyzing the micro correlations of all the multiple segments of the first specified media item for macro correlations between the input from the user for the multiple segments to verify patterns in the multiple segments of the first specified media item that caused the user to give the input for the each of the multiple segments; and
    the computer system analyzing multiple segments of a second specified media item for patterns, correlating the patterns in the second media item with said patterns in the first media item, applying a rating to each of the multiple segments of the second specified media item based on the correlation of the patterns in the second specified media item with said patterns in the first specified media item, and using said ratings of the multiple segments of the second specified media item to determine a content rating of the second media item customized for the user.

2. The method according to claim 1, wherein:
    the analyzing said input includes identifying defined likes and dislikes of the user from said input; and
    the correlating the analyzed input includes comparing said defined likes and dislikes of the user to the multiple segments of the second specified media item.

3. The method according to claim 1, wherein the receiving input from the user about multiple segments of a first specified media item includes receiving from the user providing input relative to an existing content guide to the first specified media item.

4. The method according to claim 3, wherein:
    the receiving input from the user relative to an existing content guide includes
    providing the content guide to the user, and
    correlating the markings by the user of elements of the content guide with subject matter of the first media item.

5. The method according to claim 1, wherein the receiving input from the user about multiple segments of a first specified media item includes receiving said input from the user while the user is watching the specified video content.

6. The method according to claim 1, wherein the applying a cognitive analysis of the input includes:
    applying a customized rating to each of the multiple segments of the first media item; and
    applying a customized overall rating to the first media item based on the ratings applied to the multiple segments of the first media item.

7. The method according to claim 1, further comprising separating the first media item into the multiple segments based on content of the first media item.

8. The method according to claim 1, further comprising separating the first media item into the multiple segments based on the user input.

9. A system for providing customized ratings for a user for specified media items based on user input and a cognitive analysis of the user, the system comprising:
    a first processing device for receiving input from a user about each of multiple segments of a first specified media item; and
    a computing system for receiving the user input from the first processing device, for analyzing each of the multiple segments of the first specified media item, and applying a cognitive analysis of the user to determine what occurred during said each segment that caused the user to provide the input about said each segment and to determine one or more micro correlations between content of said each of the multiple segments and the input given by the user about the each of the multiple segments, for analyzing the micro correlations of all the multiple segments of the first specified media item for macro correlations between the input from the user for the multiple segments to verify patterns in the multiple segments of the first specified media item that caused the user to give the input for the each of the multiple segments, and for analyzing multiple segments of a second specified media item for patterns, correlating the patterns in the second media item with said patterns in the first media item, applying a rating to each of the multiple segments of the second specified media item based on the correlation of the patterns in the second specified media item with said patterns in the first specified media item, and using said ratings of the multiple segments of the second specified media item to determine a content rating of the second media item customized for the user.

10. The system according to claim 9, wherein:
the analyzing said input includes identifying defined likes and dislikes of the user from said input; and
the correlating the analyzed input includes comparing said defined likes and dislikes of the user to the multiple segments of the second specified media item.

11. The system according to claim 9, wherein the input from the user includes input relative to an existing content guide to the first specified media item, and wherein:
the analyzing the user input includes correlating the user input relative to the existing content guide with subject matter of the first media item.

12. The system according to claim 9, wherein the first processing device is a mobile communications device, and the first media item is specified video content, and the mobile communications device receives the input from the user while the user is watching the specified video content.

13. A computer program product for providing customized ratings for a user for specified media items based on user input and a cognitive analysis of the user, the computer program product comprising:
a computer readable hardware storage medium having program instructions embodied therein, the program instructions executable by a computer to cause the computer to:
receive input from a user from a user communications device about each of multiple segments of a first specified media item;
analyze each of the multiple segments of the first specified media item, and applying a cognitive analysis of the user to determine what occurred during said each segment that caused the user to provide the input about said each segment and to determine one or more micro correlations between content of said each of the multiple segments and the input given by the user about the each of the multiple segments; and
analyze the micro correlations of all the multiple segments of the first specified media item for macro correlations between the input from the user for the multiple segments to verify patterns in the multiple segments of the first specified media item that caused the user to give the input for the each of the multiple segments; and
analyze multiple segments of a second specified media item for patterns, correlating the patterns in the second media item with patterns in the first media item, applying a rating to each of the multiple segments of the second specified media item based on the correlation of the patterns in the second specified media item with said patterns in the first specified media item, and using said ratings of the multiple segments of the second specified media item a content rating of the second media item customized for the user.

14. The computer program product according to claim 13, wherein the user input includes user input relative to an existing content guide to the first specified media item.

15. The computer program product according to claim 13, wherein the program instructions are executable by a computer to cause the computer to:
separate the first media item into the multiple segments based on content of the first media item.

16. The method according to claim 1, wherein:
the user input about each of multiple segments of the first specified media item includes a rating for each of the multiple segments; and
the cognitive analysis of the user includes sentiment analysis, alchemy language, tone analyzer, visual recognition, and personality insight.

* * * * *